United States Patent [19]
Sobue

[11] Patent Number: 5,734,204
[45] Date of Patent: Mar. 31, 1998

[54] BACKUP APPARATUS

[75] Inventor: Ikuo Sobue, Kawasaki, Japan

[73] Assignee: Canon Kabushiki Kaisha, Tokyo, Japan

[21] Appl. No.: 213,519

[22] Filed: Mar. 16, 1994

[30] Foreign Application Priority Data

Mar. 17, 1993 [JP] Japan .................................. 5-056994

[51] Int. Cl.$^6$ ...................................................... H02J 7/00
[52] U.S. Cl. ............................. 307/65; 307/66; 307/85; 365/229
[58] Field of Search ............................ 307/64, 66, 18, 307/19, 21, 23, 29, 43, 65, 85, 86, 87; 365/226, 229

[56] References Cited

U.S. PATENT DOCUMENTS

| | | | |
|---|---|---|---|
| 4,277,692 | 7/1981 | Small | 307/66 |
| 4,401,895 | 8/1983 | Petkovsek | 307/66 |
| 4,659,942 | 4/1987 | Volp | 307/19 |
| 4,673,826 | 6/1987 | Masson | 307/66 |
| 4,675,539 | 6/1987 | Nichol | 307/64 |
| 4,692,145 | 9/1987 | Weyant | 604/65 |
| 5,148,042 | 9/1992 | Nakazoe | 307/65 |
| 5,177,371 | 1/1993 | Faulk | 307/66 |
| 5,278,798 | 1/1994 | Miyawaki | 365/229 |
| 5,300,674 | 4/1994 | Shimamoto | 320/15 |

Primary Examiner—William M. Shoop, Jr.
Assistant Examiner—Jonathan Kaplan
Attorney, Agent, or Firm—Fitzpatrick, Cella Harper & Scinto

[57] ABSTRACT

A backup apparatus includes a main body power supply for applying a voltage from a main body to loads during a normal operation, a first backup power supply for applying a power supply voltage to a specific load of the loads when a voltage of the main body power supply drops, a second backup power supply for applying a power supply voltage to the specific load when a voltage of the first backup lower supply drops, a first threshold voltage generator for generating a first threshold voltage generated by the first backup power supply, a second threshold voltage generator for generating a second threshold voltage generated by the second backup power supply, a comparator for comparing the first threshold voltage with the second threshold voltage, a first switch circuit for switching the power supply voltage applied to the specific load from the main body power supply to the first backup power supply when the voltage of the main body power supply drops, and a second switch circuit for switching the power supply voltage applied to the specific load from the first backup power supply to the second backup power supply in accordance with a comparison result from the comparator when the voltage of the first backup power supply drops.

13 Claims, 13 Drawing Sheets

FIG. 13
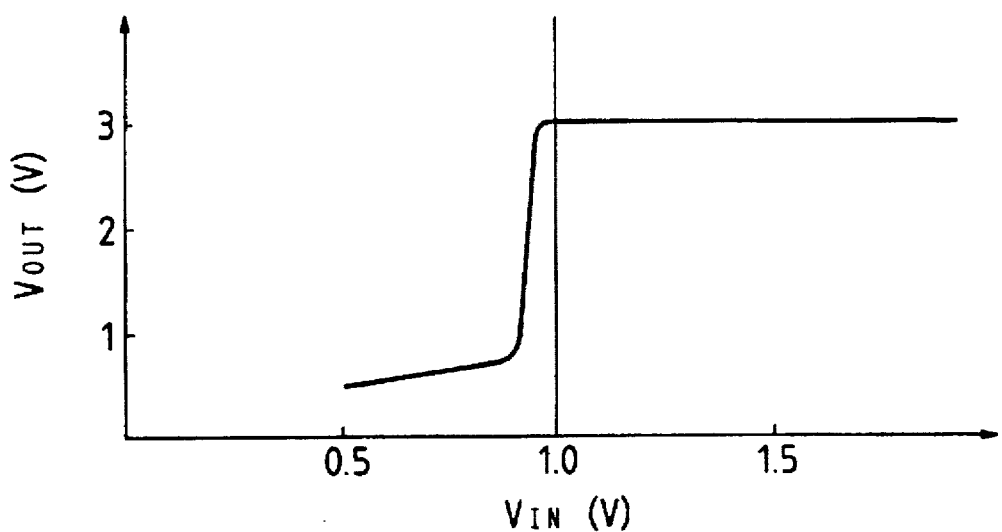
FIG. 14
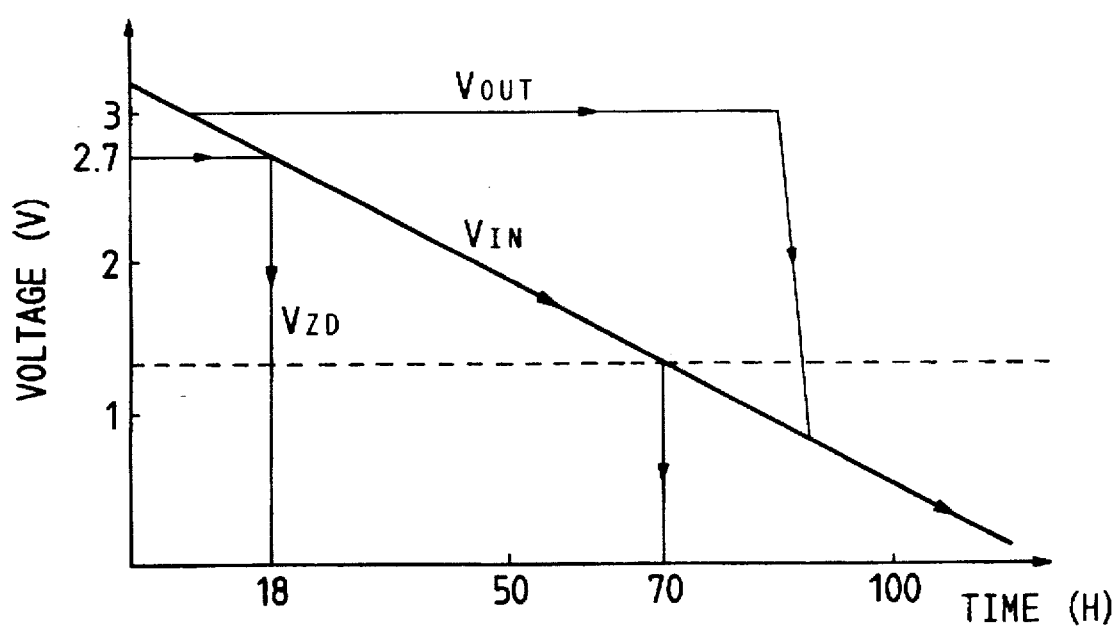

BACKUP APPARATUS

BACKGROUND OF THE INVENTION

1. Field of the Invention

The present invention relates to a backup apparatus of an information processing apparatus such as a personal computer, a wordprocessor, a facsimile machine or the like and, more particularly, to a backup apparatus of a memory having a memory backup power supply switch circuit with a backup function having a self-refresh function.

2. Related Background Art (A) A conventional apparatus of this type generally comprises a main body power supply for supplying power to a load constituting the apparatus during a normal operation, a first backup power supply for holding a first load constituting the apparatus when the voltage of the main body power supply drops, a generating means for generating a first threshold voltage on the basis of the first backup power supply, a generating means for generating a second threshold voltage on the basis of the main body power supply, a comparing means for comparing the first and second threshold voltages, and a backup power supply switching means for switching the main body power supply and the first backup power supply in accordance with a comparison result from this comparing means. When the voltage of the main body power supply drops, the power supply is switched to the output of the first backup power supply. When the voltage of the main body power supply is restored, and the voltage of the first backup power supply is lower than a rated voltage, the main body is notified in accordance with the comparison result from the comparing means that the backup power supply is abnormal. When the first backup power supply is charged by the main body power supply, even if the voltage of the first backup power supply is lower than a rated voltage upon normal operation, the state of the backup power supply is not indicated.

(B) In addition, the conventional apparatus of this type has the following arrangement:

① When a memory without a self-refresh function is used as an element, an uninterruptible power supply apparatus is connected, a hard disk drive unit or floppy disk drive unit is mounted, an SRAM (static RAM) is used as the element, and only a backup power supply switch circuit is arranged.

② Alternatively, when a memory with a self-refresh function is used as an element, a memory controller is backed up to perform a self-refresh operation when the power supply voltage drops.

(C) Further, the conventional apparatus of this type, in which a secondary battery is used as a backup power supply to hold the data of a RAM (random access memory) or the like, has a first power supply for supplying power to the apparatus upon normal operation, the secondary battery as a second power supply whose output voltage drops with time depending on a discharge time, and a power supply switching means for switching the first and second power supplies. When the voltage of the first power supply drops, the power supply is switched by the power supply switching means to the second power supply. As for the guarantee of backup data, a hold time is roughly indicated, or sum check data before backup is compared with sum check data after back up to make recognition.

[Problems to be solved by the Invention]

In the above prior art (A), however, when the first backup power supply is a charging power supply, the following problems arise.

First, the power supply keeps discharging even when the voltage drops below the guaranteed voltage range of the load. The first backup power supply is kept overdischarged and requires much time to charge upon restoration of the main body power supply. In addition, repetition of overdischarging shortens the service life of the power supply.

Second, since the voltage drop of the first backup power supply is compared with the voltage of the main body power supply, the comparison accuracy becomes unstable due to the following reason. Although the voltage of the main body power supply is normally applied to other loads, the voltage greatly varies depending on the conditions of the powered loads. Additionally, when the power supply voltage is also applied to a clock source, spike noise can be superposed on a power supply line, causing erroneous operation of a comparator.

Third, the user is not provided with a warning of the abnormality in the backup power supply. For this reason, when the power supply is turned off again a short period of time after the main body power supply is restored and before the first backup power supply is charged, the backup of the load is not guaranteed.

In ① of the above prior art (B), connection of an uninterruptible power supply apparatus results in a large arrangement so that the apparatus becomes bulky and expensive. When a hard disk drive unit or floppy disk drive unit is mounted, memory access is complicated which also tends to make the apparatus expensive. Although an SRAM is often used as an element and only a backup switch circuit is arranged in a conventional apparatus, the unit cost of an SRAM element is high.

In ② of the above prior art (B), the memory controller is backed up to perform a self-refresh operation when the power supply voltage drops. With this arrangement, however, the backup current increases to shorten the backup time, thereby degrading reliability.

In the above prior art (C):

first, the backup power supply voltage drops with discharge time;

second, the self-discharging current of the secondary battery varies depending on environmental conditions; and third, the guaranteed power supply voltage range is narrow as the load condition of a RAM or the like. In order to guarantee backup data, in environmental conditions in which the self-discharging current of the secondary battery is maximized, a time required until the secondary battery voltage reaches the lower limit of the guaranteed power supply voltage range as the load condition must be indicated.

In this case, data cannot be guaranteed although energy is still left in the secondary battery. Although data may be guaranteed by sum check data, this method requires much time depending on the memory capacity.

SUMMARY OF THE INVENTION

It is the first object of the present invention to provide a backup apparatus for solving the problems of the above prior art (A), in which a backup power supply can be prevented from overdischarging to prolong the service life of the power supply, the voltage drop of the backup power supply can be accurately detected, a user can be warned when the power supply is turned off, and a backup guarantee time can be prolonged.

In order to achieve the first object of the present invention, according to the first aspect of the present invention, there is provided a backup apparatus comprising a first backup power supply for applying a power supply voltage to a load when a voltage of a main power supply drops, first threshold; voltage generating means for generating a first threshold voltage generated by the first backup power supply, second threshold voltage generating means for generating a second threshold voltage using a second backup power supply, comparing means for comparing the first threshold voltage with the second threshold voltage, switching means for switching the power supply voltage applied to the load from the main body power supply to the first backup power supply in response to an output from the stored comparison means, and output means for outputting the status of the first backup power supply in accordance with a comparison result from the first comparing means.

It is the second object of the present invention to provide a compact and inexpensive backup apparatus with high reliability, which solves the problems of the above prior art (B).

In order to achieve the second object of the present invention, according to the second aspect of the present invention, there is provided a backup apparatus comprising a memory having a self-refresh function, memory address control means for controlling an address of the memory, a device power supply for applying a power supply voltage to the memory, P/S voltage drop detecting means for detecting a voltage drop of the device power supply, pulse signal generating means for generating a pulse signal for notifying the voltage drop of the device power supply in accordance with a detection signal from the P/S voltage drop detecting means, signal delaying means for delaying the pulse signal, a backup power supply for applying a power supply voltage to the memory when the voltage of the device power supply drops, first switching means for switching the device power supply to the backup power supply in accordance with the pulse signal, a data multiplexer having one input connected to the memory address control means, the other input connected to the delaying means, and an output connected to the memory, and second switching means for switching an input signal to the data multiplexer in accordance with the pulse signal.

It is the third object of the present invention to provide a compact and inexpensive backup apparatus for solving the problems of the above prior art (C), in which backup data can be guaranteed for a longer time for a power supply having the same capacity, a load voltage can be stably applied during a backup operation, and the voltage of a backup power supply with high reliability can be applied.

In order to achieve the third object of the present invention, according to the third aspect of the present invention, there is provided a backup apparatus comprising a first power supply for applying a power supply voltage from a main body to a load during a normal operation, a second power supply whose output voltage changes with time depending on a discharge time, voltage converting means, connected to an output side of the second power supply, for converting an arbitrary input voltage into a predetermined voltage, voltage drop detecting means for detecting a voltage drop of the first power supply, and switching means for switching the power supply voltage applied to the load from an output of the first power supply to an output of the voltage converting means in accordance with detection by the voltage drop converting means.

BRIEF DESCRIPTION OF THE DRAWINGS

FIG. 13 is a graph showing the output voltage to input voltage characteristics of the step-up converter; and FIG. 14 is a graph showing the relationship between the input and output voltages of the step-up converter in FIG. 2 and a time.

DETAILED DESCRIPTION OF THE PREFERRED EMBODIMENTS

The embodiments of the present invention will be described below in detail with reference to the accompanying drawings.

(First Embodiment)

Figure 1:
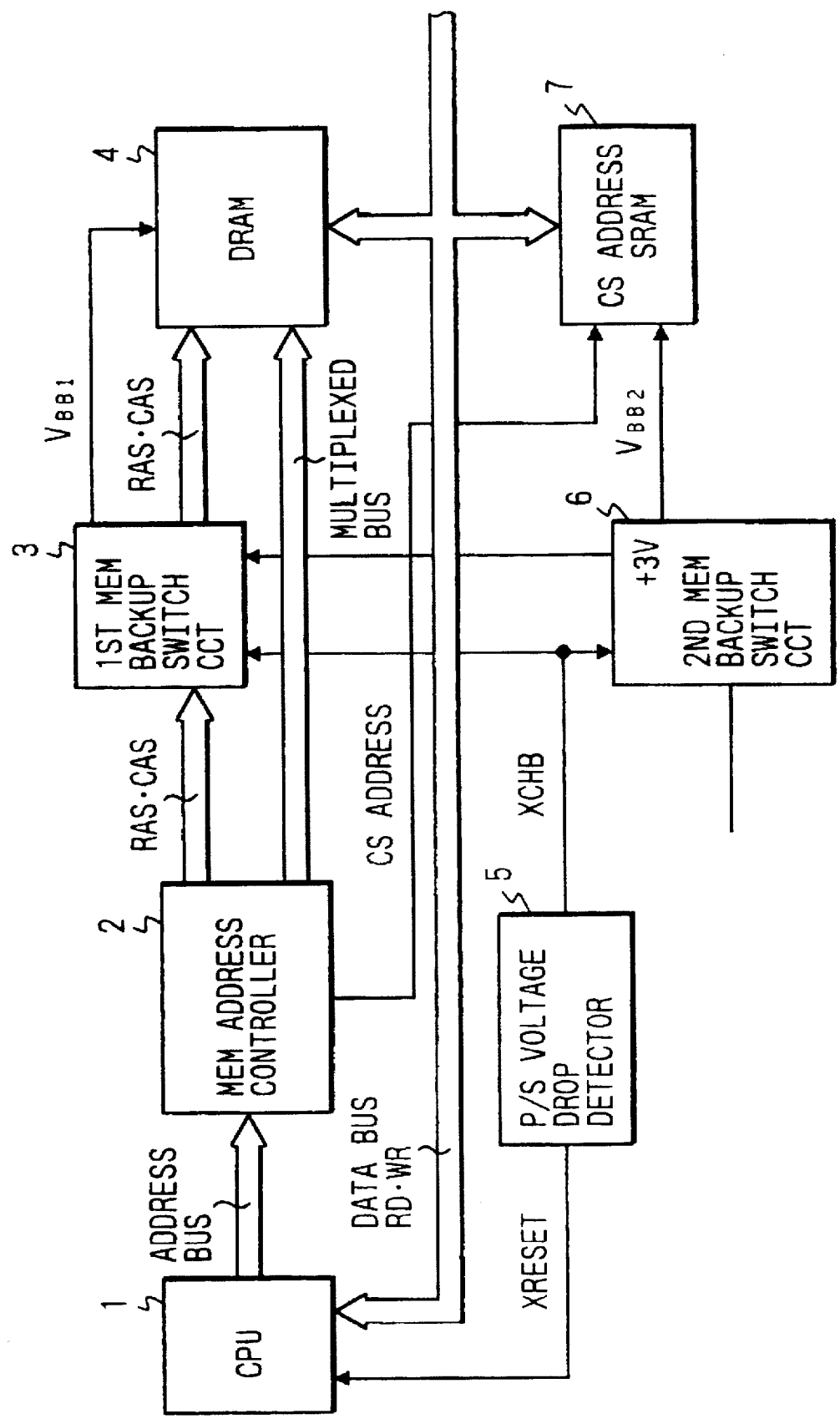
FIG. 1 is a block diagram showing the circuit arrangement of a memory backup apparatus of the first embodiment of the present invention.

FIG. 1 is a block diagram showing the circuit arrangement of a memory backup apparatus of the first embodiment of the present invention corresponding to the first aspect of the present invention. This memory backup apparatus has a CPU (central processing unit) 1 such as a microcomputer, a memory address controller 2 for converting addresses of a CPU address bus into an RAS (row address strobe), CAS (column address strobe), or multiplexed address for a DRAM (dynamic random access memory), a first memory backup switch circuit 3 for switching the RAS or CAS for the DRAM to a self-refresh signal in accordance with a P/S voltage drop detection signal, a DRAM 4 with a self-refresh function, a P/S voltage drop detector 5 of a reset IC (integrated circuit), a second memory backup switch circuit 6 for an SRAM (static random access memory), and an SRAM 7.

Figure 2:
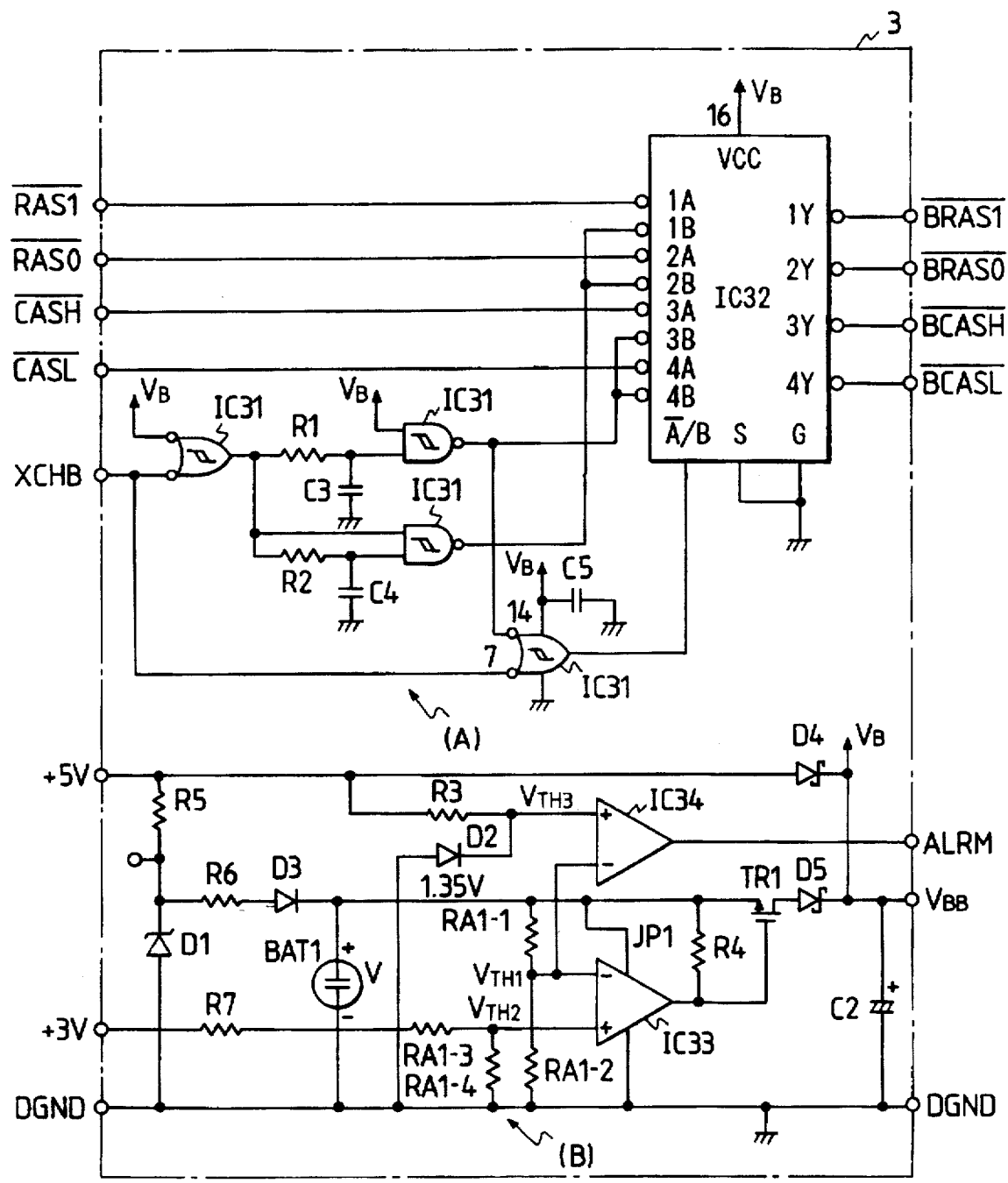
FIG. 2 is a detailed circuit diagram of a memory backup switch circuit in FIG. 1, in which a portion (A) represents an RAS/CAS signal switch circuit, and a portion (B) represents a circuit for switching a device power supply and a backup battery.

FIG. 2 is a circuit diagram showing the detailed circuit arrangement of the first memory backup switch circuit 3 shown in FIG. 1. A portion (A) represents an RAS/CAS signal switch circuit, and a portion (B) represents a power supply switch circuit for switching a device power supply and a backup battery. In the RAS/CAS signal switch circuit (A), during a normal operation, signals RAS1, RAS0, CASH, and CASL output from the memory address controller 2 are connected and supplied to the memory 4 through a multiplexer IC32 as signals BRAS1, BRAS0, BCASH, and BCASL. On the other hand, during a backup switching operation, a P/S voltage drop detection signal XCHB output from the P/S voltage drop detector 5 generates a timing pulse of a CBR (CAS before RAS) self-refresh cycle and switches the input signals to the multiplexer IC32 to be connected and supplied to the memory 4 as RAS and CAS signals.

The power supply switch circuit (B) has a secondary battery BAT1. The charger of this battery is constituted by a reference voltage generator comprising a resistor R5 and a Zener diode D1 connected in series with the resistor R5 and a charge current controller comprising a resistor R6 and a diode D3 connected in series with the resistor R6. A comparator IC33 compares a voltage value (VTH1) obtained by dividing the voltage of the secondary battery BAT1 by two resistors RA1-1 and RA1-2 with a voltage value (VTH2) obtained by dividing a voltage of +3 V by a combination of resistors (R7+RA1-3) and a resistor RA1-4. On the bass of the comparison result, the voltage of the secondary battery BAT1 is detected to be lower than a rated voltage (VTH2), and a transistor TR1 is then turned off.

In the power supply switch circuit, a device power supply voltage of +5 V and an output from the transistor TR1 are switched by Zener diodes D4 and D5, and a higher voltage is applied to the load (memory 4) as a voltage VBB. A comparator IC34 compares the voltage value (VTH1) obtained by dividing the voltage of the secondary battery BAT1 by the resistors RA1-1 and RA1-2 with a reference voltage (VTH3) of 1.35 V generated by dividing the device power supply voltage of +5 V by a resistor R3 and a Zener diode D2. When the voltage of +5 V is applied and BAT1 (voltage of the secondary battery)>1.35 V, an output signal ALRM becomes "L" (low level). When BAT1≦1.35 V, the output signal ALRM becomes "H" (high level). When the main body power supply is to rise, the main body apparatus can check if backup data is guaranteed.

Figure 3:
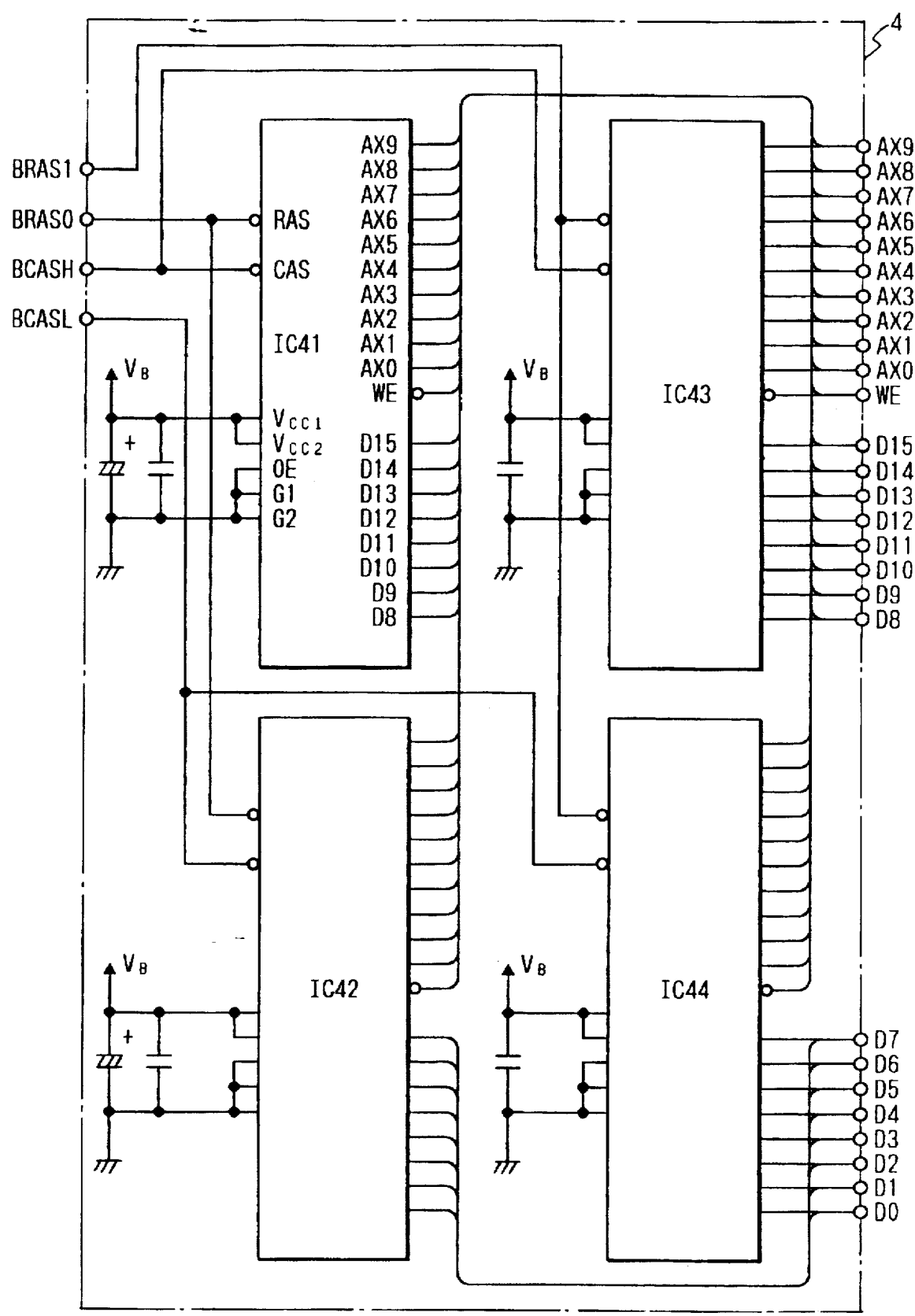
FIG. 3 is a connection circuit diagram of a DRAM in FIG. 1.

FIG. 3 is a circuit diagram showing the connection circuit arrangement of the DRAM 4 shown in FIG. 1. The DRAM 4 includes 4-Mbit DRAMs IC41 to IC44 of 8-bit bus configuration having a CBR self-refresh function.

Figure 4:
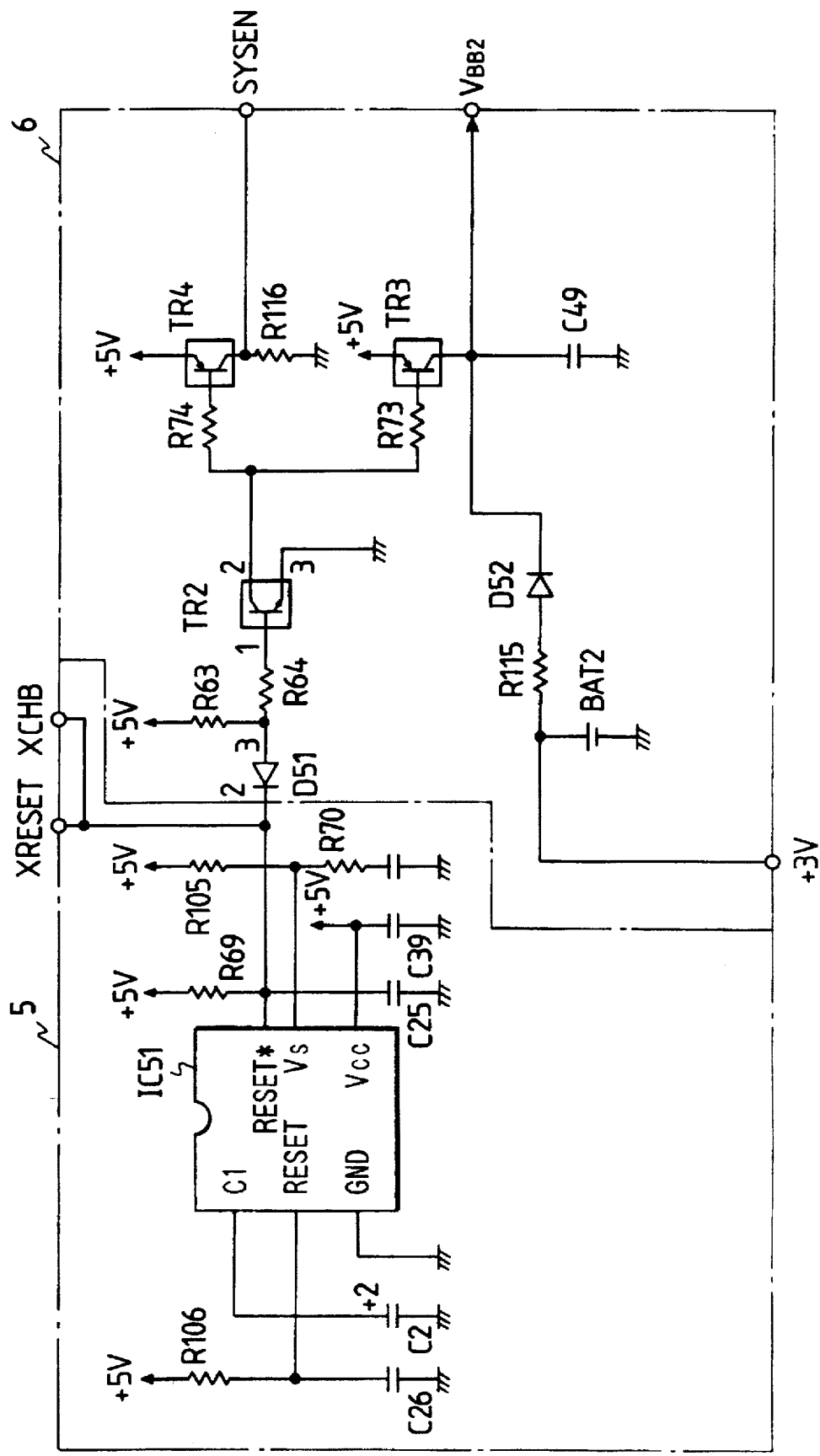
FIG. 4 is a detailed circuit diagram showing the arrangement of a second memory backup switch circuit and a P/S voltage drop detector in FIG. 1.

FIG. 4 is a circuit diagram showing the P/S voltage drop detector 5 and the second memory backup switch circuit 6 shown in FIG. 1 in detail. In a reset IC51, an output from an output terminal RESET* is changed from "H" to "L" when the power supply voltage of +5 V drops. When the output from the output terminal RESET* is changed from "H" to "L", a transistor TR2 is turned off through a diode D51 and a resistor R64. Accordingly, transistors TR4 and TR3 are also turned off. An output signal SYSEN from the second memory backup switch circuit 6 becomes "L", and the voltage (+3 V) of a primary battery BAT2 is applied as an output signal VBB2.

Figure 5:
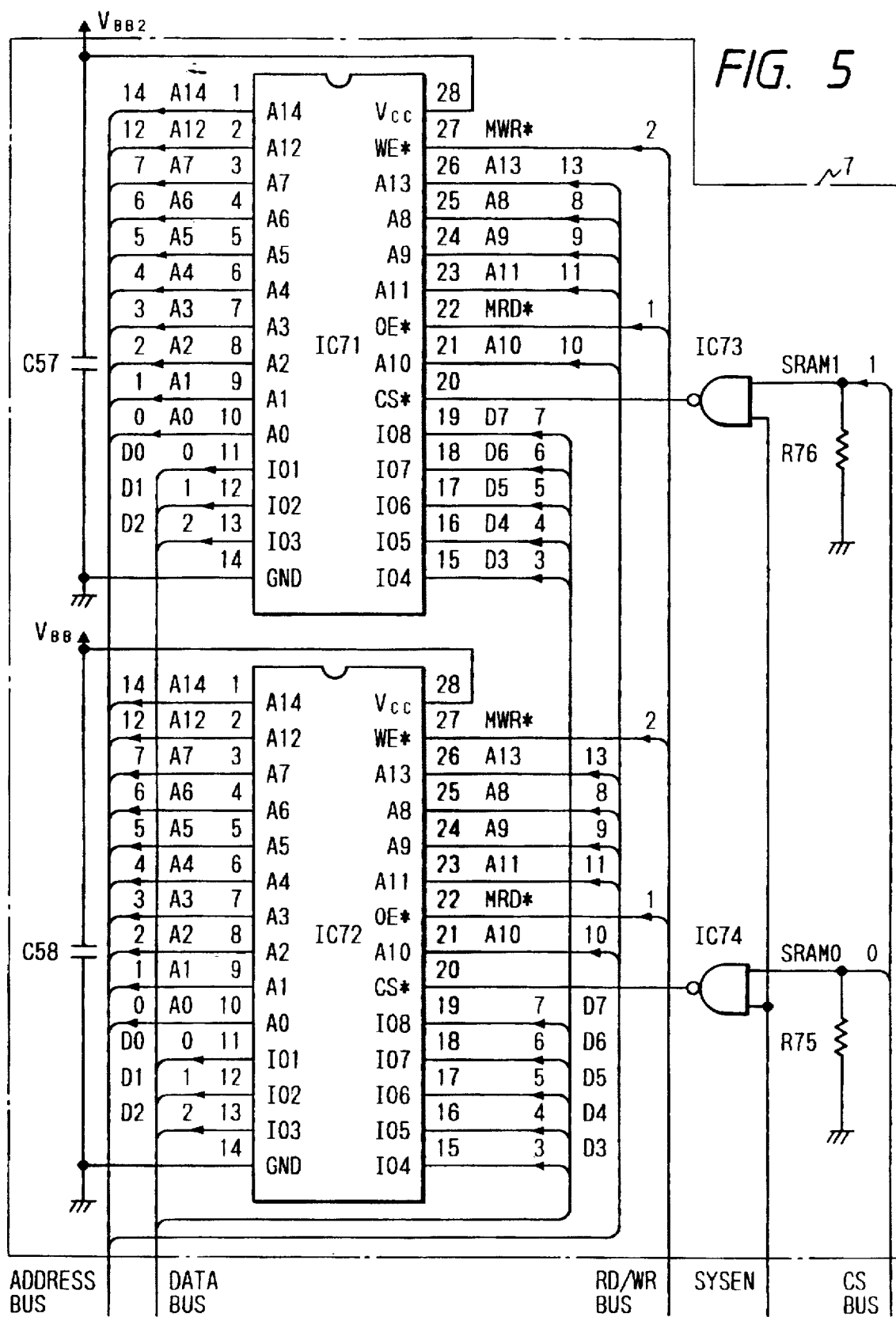
FIG. 5 is a connection circuit diagram of an SRAM in FIG. 1.

FIG. 5 is a circuit diagram showing the arrangement of the SRAM 7 shown in FIG. 1 in detail. The signal SYSEN is connected to the input terminals of gate circuits IC73 and IC74 in FIG. 5. With this arrangement, when the power supply voltage is lower than +5 V, chip select signals to memories IC71 and IC72 are disabled.

The timing chart in FIG. 6 will be described below in accordance with the circuit diagram in FIG. 2.

Figure 6:
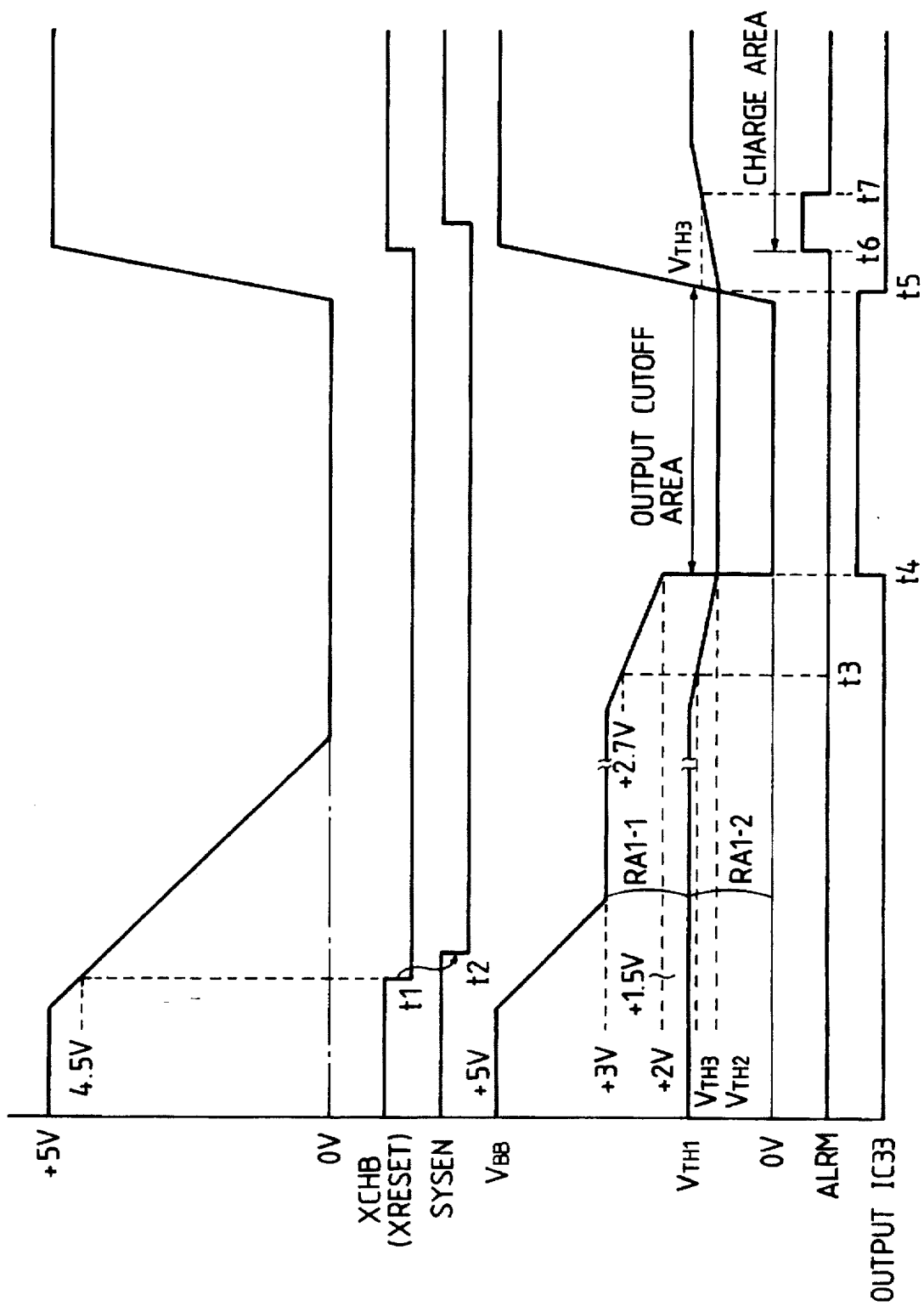
FIG. 6 is a timing chart showing the operation of the circuit in FIG. 2.

Referring to FIG. 6, when the device power supply voltage drops from +5 V to +4.5 V, an output signal XRESET from the reset IC51 in FIG. 4 becomes "L" at a timing T1 in FIG. 6. The signal SYSEN also becomes "L" at a timing T2 to prohibit access to the SRAM 7. On the other hand, the voltage VBB (FIG. 2) of the backup power supply line drops as the voltage of +5 V drops. When the voltage VBB is lowered to the voltage value of +3 V of the secondary battery BAT1, the power supply is switched to the secondary battery BAT1 side by the Zener diodes D4 and D5 in FIG. 2. At this time, a voltage (initial value is +1.5 V) obtained by dividing the voltage of the secondary battery BAT1 by the resistors RA1-1 and RA1-2 is input to the−input terminal of the comparator IC33. The voltage (VTH2) obtained by dividing the voltage of +3 V applied from the second memory backup switch circuit 6 by the resistors (R7+RA1-3) and RA1-4 is input to the+input terminal of the comparator IC33. The resistor RA7 is selected to satisfy VTH2=+1 V. When the voltage of the secondary battery BAT1 drops below the voltage value of +2 V, the input voltage to the−input terminal of the comparator IC33 drops below +1 V, and the output from the comparator IC33 changes from "L" to "H" at a timing T4. The transistor TR1 kept set in an ON state is turned off, and the voltage of the output terminal VBB becomes 0 V. When the device power supply voltage rises again to exceed the divided voltage VTH2, the output voltage from the comparator IC33 changes from "H" to "L" at a timing T5, and the transistor TR1 restores an ON state.

The same signal as in the−input terminal of the comparator IC33 is input to the−input terminal of the comparator IC34. A fixed voltage of +1.35 V (VTH3) is input to the+input terminal of the comparator IC34. When the voltage of the secondary battery BAT1 drops to the guaranteed voltage value of +2.7 V of the memory, the input voltage to the−input terminal of the comparator IC34 is less than +1.35 V. However, since the device power supply voltage of +5 V is not applied, the output signal ALRM from the comparator IC34 does not change at the timing T3 to remain "L". When the device power supply voltage rises again toward +5 V, and the divided voltage VTH1 is restored to +1.35 V, the signal ALRM changes from "L" to "H" at a timing T6 to indicate that the voltage of the secondary battery BAT1 is lower than the rated voltage. When the secondary battery BAT1 is charged and its voltage exceeds the divided voltage VTH3, the output signal ALRM from the comparator IC34 changes from "H" to "L" at a timing T7 to indicate that data can be backed up.

With the above operation, in this embodiment, when the backup power supply voltage VBB drops (T4 to T5), power supply to the DRAM 4 can be stopped. In addition, when the backup power supply voltage is lower than the rated voltage, and the backup operation cannot be performed, the main body is notified by the signal ALRM to indicate that the backup power supply is abnormal or in a charging state.

In the above embodiment, the primary battery BAT2 for applying the voltage of +3 V can be used as a supplementary power supply for the secondary battery BAT1. More specifically, the primary battery BAT2 is connected to the terminal VBB through the switch of +3 V and switched by using the signal ALRM. The power supply voltage of the primary battery BAT1 can be applied to the DRAM 4 even when the voltage of the secondary battery BAT1 drops below +2.7 V. With this arrangement, the backup time can be prolonged as long as possible.

(Second Embodiment)

Figure 7:
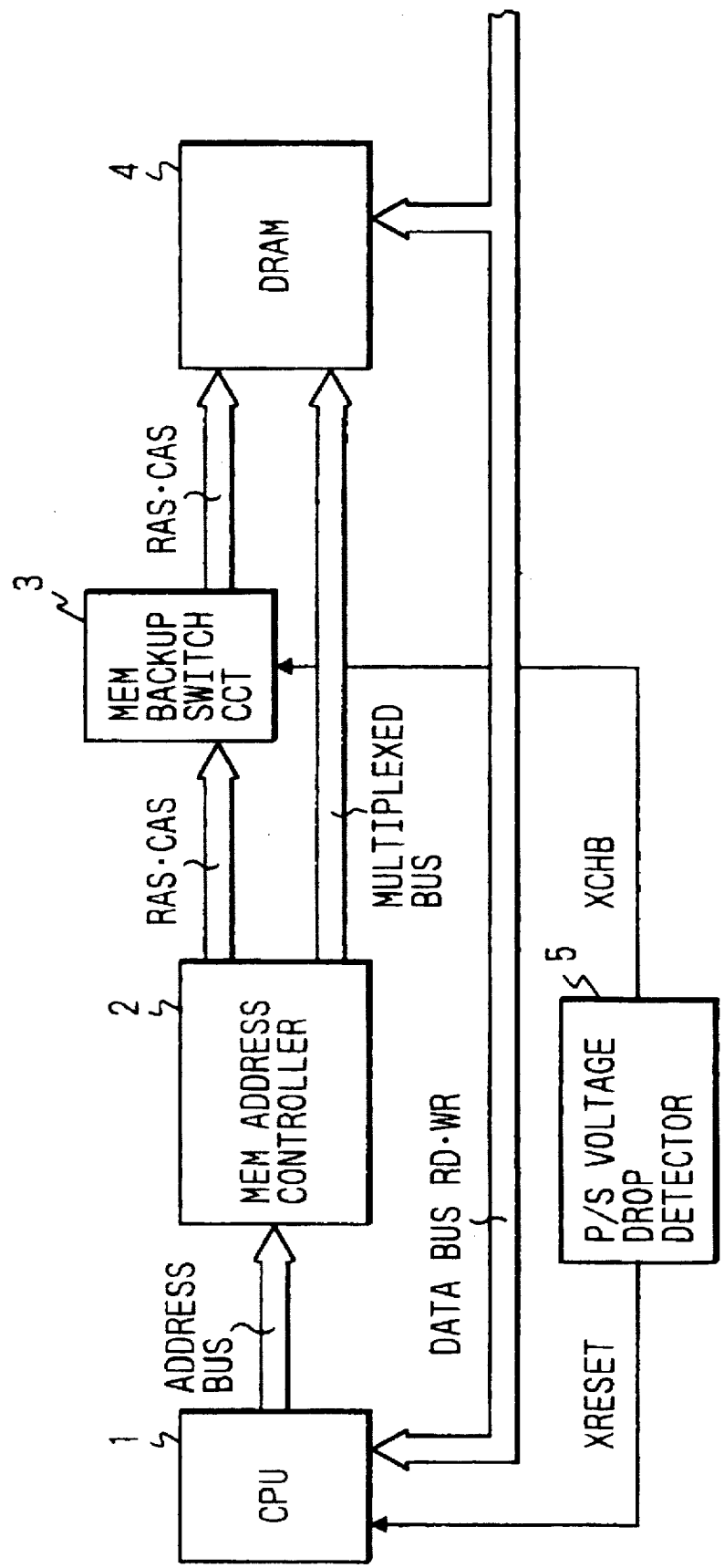
FIG. 7 is a block diagram showing the circuit arrangement of a memory backup apparatus of the second embodiment of the present invention.

FIG. 7 is a block diagram showing the circuit arrangement of a memory backup apparatus of the second embodiment of the present invention corresponding to the second aspect of the present invention. This apparatus is constituted by a CPU 1, a memory address controller 2, a memory backup switch circuit 3, a DRAM 4, and a P/S voltage drop detector 5. The operation of each circuit is almost the same as in FIG. 1.

Figure 8:
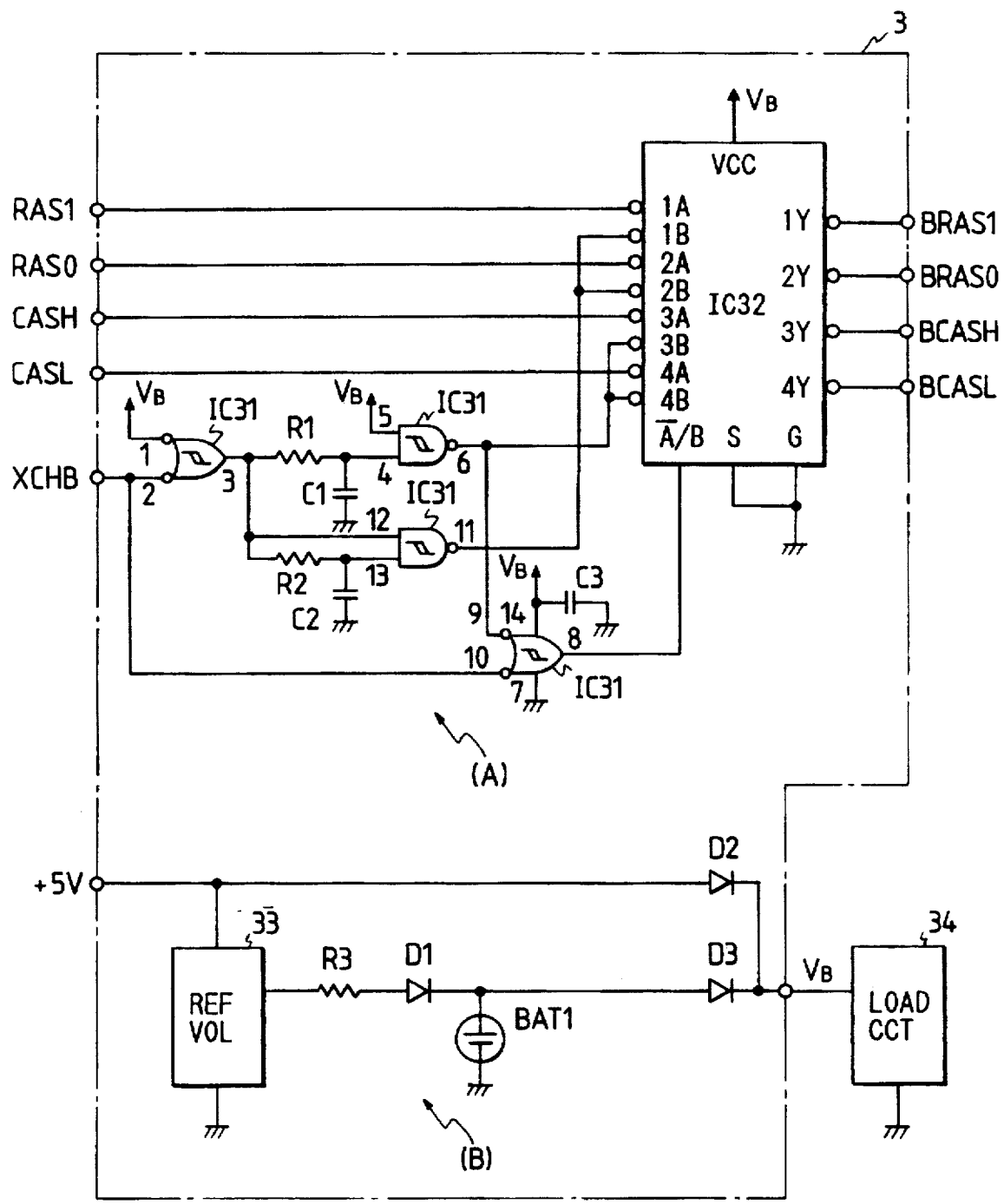
FIG. 8 is a detailed circuit diagram of a memory backup switch circuit in FIG. 7.

FIG. 8 is a circuit diagram showing the detailed circuit arrangement of the memory backup switch circuit 3 shown in FIG. 7. A portion (A) represents an RAS/CAS signal switch circuit having the same arrangement as in FIG. 2, and a portion (B) represents a power supply switch circuit (B) for switching a device power supply and a backup battery. The power supply switch circuit (B) has a secondary battery BAT1 and a reference voltage circuit 33.

The connection circuit arrangement of the DRAM 4 in FIG. 7 is the same as in FIG. 3, and a description thereof will be omitted.

Figure 9:
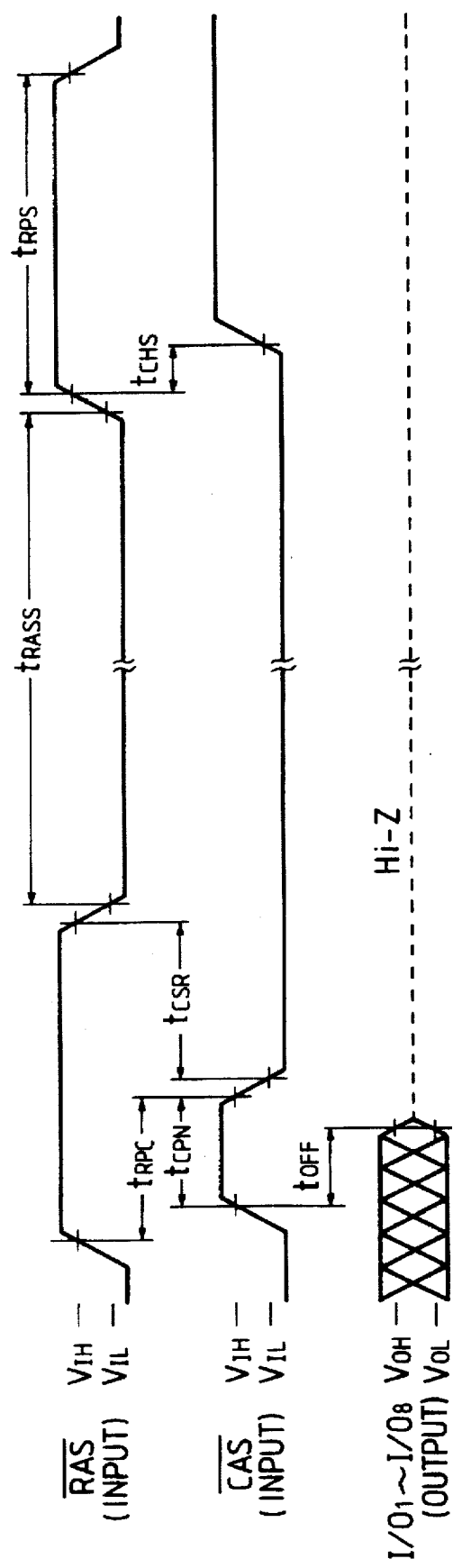
FIG. 9 is a timing chart showing a guarantee time of the CAS before RAS self-refresh cycle of a DRAM in FIG. 7.

FIG. 9 is a timing chart showing the guarantee time of the CAS before RAS (CBR) self-refresh cycle of the DRAM 4 in FIG. 7.

Figure 10:
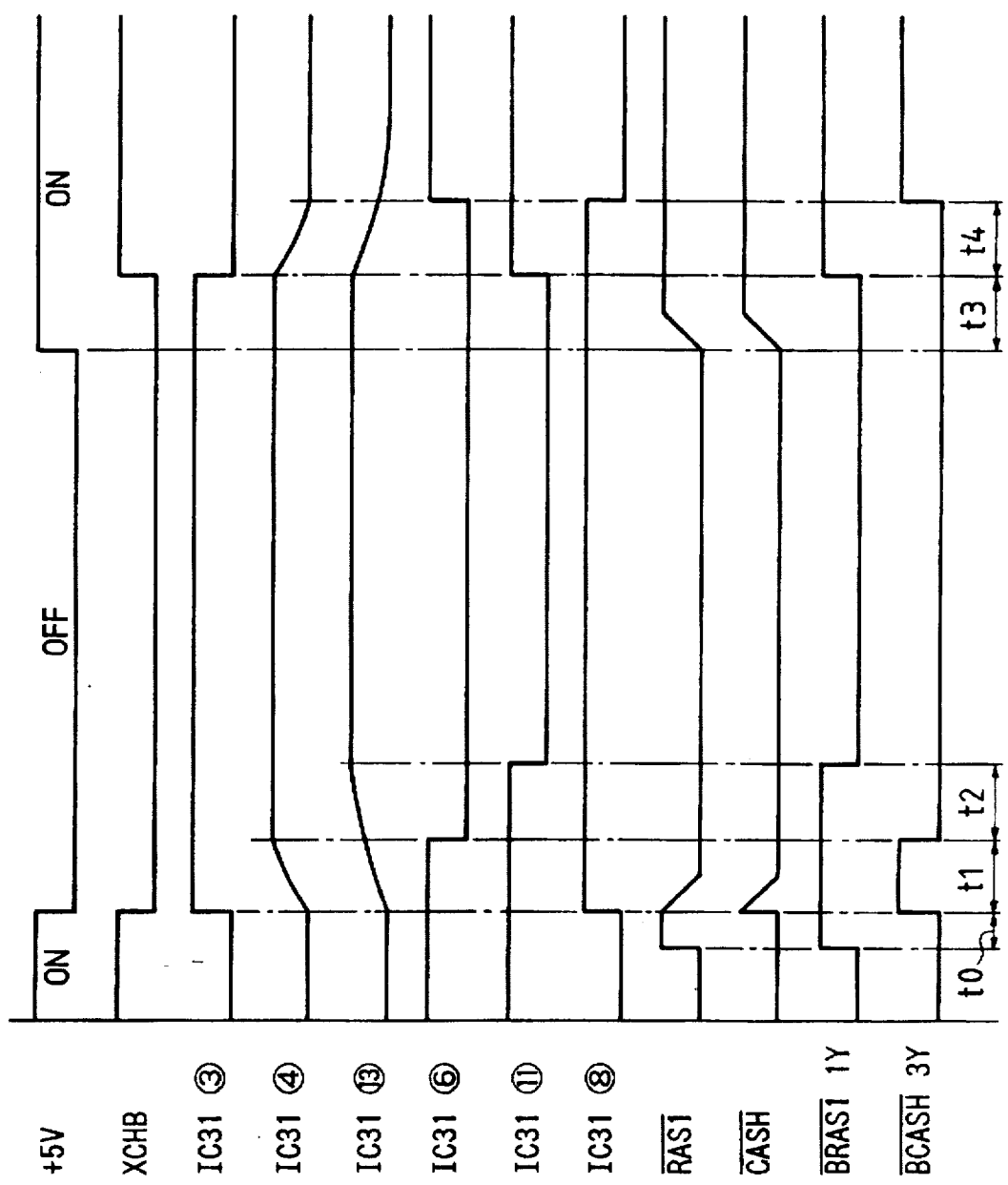
FIG. 10 is a timing chart showing the relationship between the input and output signals of the circuit in FIG. 8.

FIG. 10 is a timing chart showing the relationship between the input and output signals of the memory backup switch circuit 3 shown in FIG. 8.

The operation of the second embodiment of the present invention in each mode will be described below with reference to FIGS. 7 to 10.

① Normal Operation

A voltage of +5 V is stably applied from the main body power supply to the main body apparatus. At this time, signals XRESET and XCHB output from the P/S voltage drop detector 5 are "H". In the memory backup switch circuit 3 in FIG. 8, an input switch signal A/B to a multiplexer IC32 becomes "L" to select input signals on the A side. Input signals RAS1, RAS0, CASH, and CASL are output to output terminals as signals BRAS1, BRAS0, BCASH, and BCASL. Therefore, RAS/CAS signals output from the memory address controller 2 in FIG. 7 are input to the DRAM 4.

② Switching Operation upon Drop of Power Supply Voltage

The backup switch guarantee timing in this embodiment guarantees data one cycle before the current write address during write access to the DRAM 4, and guarantees all data during a period except for the period during write access to the DRAM 4. Therefore, only the worst case in which the backup switching operation is performed just before the end of a write cycle will be described.

The circuit in FIG. 8 includes Schmitt trigger input NAND gates IC31. When integral waveforms formed by resistors R1 and R2 and capacitors C1 and C2 are input to pins 4 and 13 of the NAND gates IC31, an RC input signal is delayed to obtain a NAND output.

Referring to FIG. 9, a time $T_{RPC}$ represents an RAS precharge/CAS hold time; $T_{CPN}$, a CAS precharge time; $T_{CSR}$, a CAS setup time; $T_{RASS}$, an RAS pulse width; $T_{CHS}$, a CAS hold time; and $T_{RPS}$, an RAS precharge time. Time constants are selected such that a time constant $R1 \times C1 > T_{CPN}$, a time constant $R2 \times C2 > T_{CPN} + T_{CSR}$, and a time constant $R1 \times C1 > T_{CHS}$.

FIG. 10 shows a state in which after the signal RAS1 the immediately preceding cycle rises and the power supply voltage of +5 V drops after a time T0 in FIG. 10 and just before the signal CASH rises. When the power supply voltage drops, the output signal XCHB from the P/S voltage drop detector 5 simultaneously falls. Referring to FIG. 8, when the signal XCHB is input to pin 2 of the NAND gate IC31, an output signal from pin 3 of the NAND gate IC31 is represented by ③ in FIG. 10. In accordance with the rise signal from pin 3 of the NAND gate IC31, integrators R1C1 and R2C2 generate integral waveforms. These waveforms are represented by waveforms (④ and ⑬) from pins 4 and 13 of the NAND gates IC31. The integral waveform from the integrator R1C1 is delayed by the Schmitt gate and inversely output as a waveform (⑥) from pin 6 of the NAND gate IC31. On the other hand, the integral waveform from the integrator R2C2 is ANDed with a nonintegral waveform from pin 3, delayed by the Schmitt gate, and inversely output as a waveform (⑪) from pin 11 of the NAND gate IC31. The output signals from pins 6 and 11 of the NAND gates IC31 become RAS and CAS signals through the multiplexer IC32 to generate self-refresh signals. The signal XCHB is input to pin 10 of the NAND gate IC31, and as its inverted signal, the input switch signal A/B to the multiplexer IC32 is output to pin 8 of the NAND gate IC31.

The output signals BRAS1 and BRAS0 from output terminals 1Y and 2Y of the multiplexer IC32 are caused to output the input signals RAS1 and RAS0 before the P/S voltage drop detection signal XCHB falls and are caused to output the signal from pin 11 of the NAND gate IC31 after the P/S voltage drop detection signal XCHB falls. Similarly, the output signals BCASH and BCASL from output terminals 3Y and 4Y of the multiplexer IC32 are caused to output the input signals CASH and CASL before the P/S voltage drop detection signal XCHB falls and are caused to output the signal from pin 6 of the NAND gate IC31 after the P/S voltage drop detection signal XCHB falls. A time T1 in FIG. 10 is longer than the time $T_{CPN}$ in FIG. 9, and a time T1+T2 is longer than the time $T_{CPN}+T_{CSR}$ in FIG. 9, so that the self-refresh cycle conditions of the DRAM 4 are satisfied.

③ Switching Operation in Rising Power Supply

Referring to FIG. 10, when the power supply voltage of +5 V is switched from OFF to ON, the rise timing of the P/S voltage drop detection signal XCHB is delayed by only a time T3 to hold the self-refresh cycle until initialization of the CPU1 is ended. When the signal XCHB rises, as in the fall of the power supply described above, the input waveforms to pins 4 and 13 of the NAND gate IC31 are as shown in FIG. 10. The output waveform from pin 6 of the NAND gate IC31 is a rise waveform delayed by only a time T4, as shown in FIG. 10. On the other hand, the output from pin 11 of the NAND gate IC31 is obtained as an inverted output of the input signal to pin 12 regardless of the presence of the integrator R2C2. The signal from pin 6 is input to pin 9 of the NAND gate IC31, and as its inverted signal, the input switch signal to the multiplexer IC32 is output to pin 8. The output terminals 1Y and 2Y (BRAS1 and BRAS0) of the multiplexer IC32 output the signal from pin 11 of the NAND gate IC31 before the signal from pin 6 of the NAND gate IC31 rises. The output terminals 1Y and 2Y output the signals RAS1 and RAS0 after the signal from pin 6 rises. Similarly, the output terminals 3Y and 4Y (BCASH and BCASL) of the multiplexer IC32 output the signal from pin 6 of the NAND gate IC31 before the signal from pin 6 of the NAND gate IC31 rises. The output terminals 3Y and 4Y output the signals CAS1 and CAS0 after the signal from pin 6 rises. The time T4 in FIG. 10 is longer than the time $T_{CHS}$ in FIG. 9, so that the self-refresh cycle conditions of the DRAM 4 are satisfied.

In this embodiment, it can easily be considered that a general-purpose delay element is used for the integrator delay system constituted by the integrators R1C1 and R2C2 and the Schmitt NAND gates IC31 in the circuit in FIG. 8. When a gate array, standard cell, or hybrid module in which gates and a multiplexer are integrally formed is used, a more stable timing is guaranteed.

In this embodiment, the DRAM 4 has been exemplified as a memory element. However, as is apparent, a dummy SRAM of a self-refresh type can be used to obtain the same effect.

(Third Embodiment)

FIGS. 11 to 14 show the third embodiment of the present invention corresponding to the third aspect of the present invention. The entire arrangement of a memory backup apparatus of this embodiment is the same as in FIG. 7, and a description thereof will be omitted.

Figure 11:
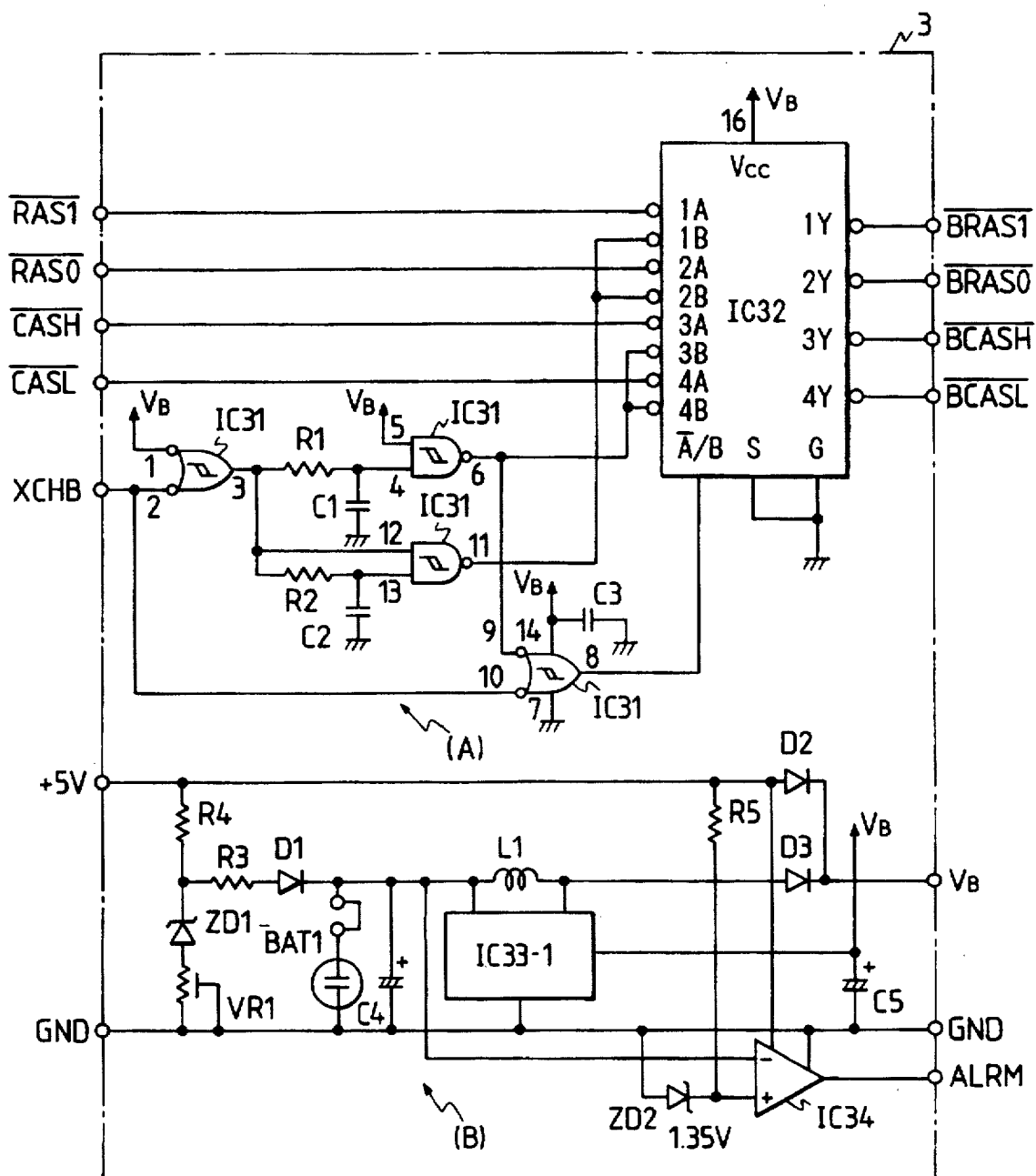
FIG. 11 is a detailed circuit diagram of the memory backup switch circuit in FIG. 7.

FIG. 11 is a circuit diagram showing the detailed circuit arrangement of a memory backup switch circuit 3 in this embodiment. A portion (A) represents an RAS/CAS signal switch circuit having the same arrangement as in FIGS. 2 and 8, and a portion (B) represents a power supply switch circuit for switching a device power supply and a backup battery.

The power supply switch circuit (B) has a secondary battery BAT1. The charger of this battery is constituted by a reference voltage generator comprising a resistor R4, a Zener diode ZD1, and a variable resistor VR1, all of which are connected in series with each other, and a charge current controller comprising a resistor R3 and a diode D1. The power supply switch circuit (B) also has a DC/DC (direct current to direct current) step-up converter IC33-1 and a step-up inductor L1. An output from this inductor and a device power supply voltage of +5 V are switched by diodes D2 and D3, and a higher voltage is applied to a load (memory 4) as a voltage VB. A comparator IC34 compares the voltage of the secondary battery BAT1 with a reference voltage of 1.35 V generated by a resistor R5 and a Zener diode ZD2. When the power supply voltage of +5 V is applied and BAT1>1.35 V, an output signal ALRM becomes "L". When BAT1<1.35 V, the output signal ALRM becomes "H". When the main body power supply rises, the main body apparatus can check by using this signal ALRM if backup data is guaranteed.

The connection circuit arrangement of a DRAM 4 of this embodiment is the same as in FIG. 3, and a description thereof will be omitted.

Figure 12:
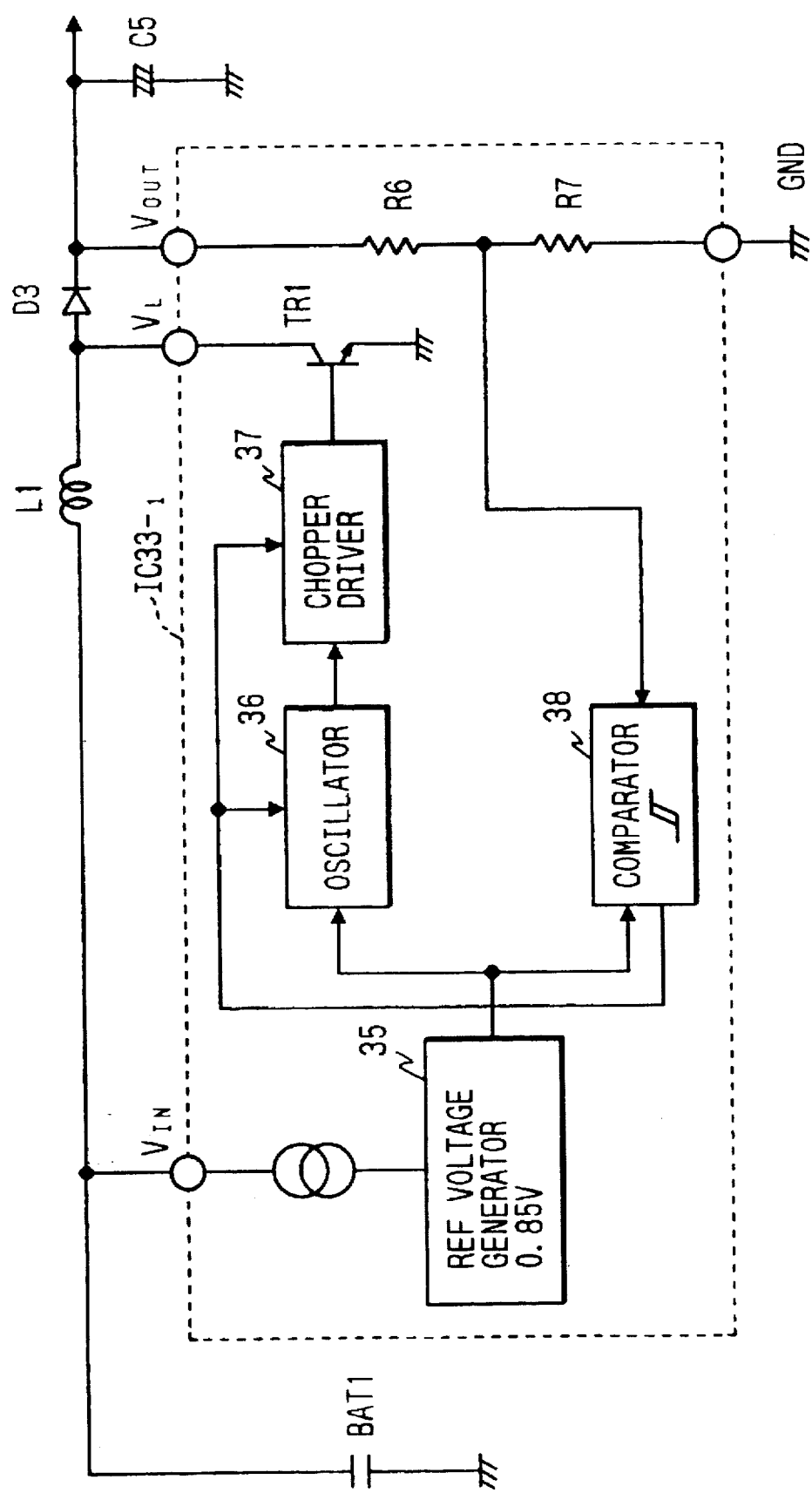
FIG. 12 is a detailed circuit diagram of a step-up converter in FIG. 7.

FIG. 12 is a circuit diagram showing the circuit arrangement of the DC/DC step-up converter IC33-1 shown in FIG. 11. FIG. 13 shows input vs. output voltage characteristics of the DC/DC step-up converter IC33-1. Referring to FIG. 12, a reference voltage generator 35 outputs a voltage of 0.85 V. The DC/DC step-up converter IC33-1 also has an oscillator 36, a chopper driver 37, and a comparator 38. The comparator 38 compares the reference voltage of 0.85 V with a voltage obtained by dividing a voltage $V_{OUT}$ by resistors R6 and R7. When the divided voltage is lower than the reference voltage, a comparison signal is generated to cause the chopper driver 37 to operate. Upon operation of the chopper driver 37, a transistor TR1 is turned on and a step-up current is caused to flow by the inductor L1 and the Zener diode D3. In this embodiment, the chopper driver 37 is operated such that the voltage $V_{OUT}$ becomes 3 V. FIG. 13 shows that the output voltage $V_{OUT}$ is 3V when an input voltage $V_{IN}$ is 1 V or more.

FIG. 14 is a graph showing the relationship between the input and output voltages $V_{IN}$ and $V_{OUT}$ and a time in the circuit in FIG. 12. A line of $V_{IN}$ represents the discharge time characteristics of the secondary battery BAT1. A line of $V_{OUT}$ represents the output characteristics of the step-up converter IC33-1. When the voltage $V_{IN}$ is 3 V or more, the voltage $V_{OUT}$ temporarily remains 3 V. When the voltage $V_{IN}$ is 1 V or less, the voltage $V_{OUT}$ abruptly drops in accordance with the characteristics in FIG. 13 to have the same characteristics as in the voltage $V_{IN}$. When the voltage $V_{IN}$ is lowered to the reference voltage $V_{ZD}$ (1.35 V), the signal ALRM changes from "L" to "H".

In a conventional low-voltage driving RAM, the power supply voltage is guaranteed at 3 V ±0.3. For this reason, without the step-up converter IC33-1, the voltage of the secondary battery BAT1 is guaranteed only up to 2.7 V. In this case, the backup time is 18 hours, as shown in FIG. 14. On the other hand, in this embodiment of the present invention, the backup time becomes 70 hours to prolong the service time by about four times.

In the above embodiment, the secondary battery has been exemplified as the second power supply. However, the second power supply can easily be realized by a primary battery which needs no charger. For example, the present invention can be implemented when a power supply using a dry cell may be used. If the voltage is lowered to a rated voltage, the dry cell may be exchanged. More specifically, when the voltage becomes lower than a rated voltage during a normal operation, the time to exchange the battery is indicated by an alarm means using the signal ALRM so that backup data is guaranteed.

As has been described above, according to the first aspect of the present invention, when the voltage of the main body power supply drops, the power supply is switched to the output of the first backup power supply. When the voltage of the first backup power supply drops thereafter, power supply from the first backup power supply to the load is stopped in accordance with the comparison result from the comparing means. Thus, the first backup power supply is prevented from overdischarging to prolong the service time of the power supply. When the voltage of the first backup power supply drops, the main body is notified in accordance with the comparison result from the comparing means that the first backup power supply is abnormal, so the voltage drop of the backup power supply can be correctly detected. During the normal operation, when the voltage of the first backup power supply is lower than a rated voltage, the main body is notified in accordance with the comparison result from the comparing means that the first backup power supply is being charged, thereby alarming the user when the power supply is turned off. When the voltage of the first backup power supply is lower than a rated voltage, the power supply is switched to the output of the second backup power supply in accordance with the comparison result from the comparing means, so the backup guarantee time can be further prolonged.

According to the second aspect of the present invention, the device power supply is switched to the backup power supply in accordance with the pulse signal for notifying the voltage drop of the power supply. The input signal to the data multiplexer is switched in accordance with the pulse signal. Therefore, a compact and inexpensive backup power supply switch circuit with high reliability can be obtained, and the backup guaranteed time can be further prolonged.

In the above second aspect of the present invention, a memory address control means is connected to one input terminal of the data multiplexer, a means for delaying the pulse signal is connected to the other input terminal, and a memory having a self-refresh function is connected to the output terminal of the data multiplexer to switch the input signal to the data multiplexer in accordance with the pulse signal for notifying the voltage drop of the power supply. With this arrangement, the backup switching operation of a compact and inexpensive memory with high reliability can be performed.

In the above third aspect of the present invention, the second power supply is connected to the input to the voltage converting means, and a means for switching the outputs of the first power supply and the voltage converting means is provided. With this arrangement, the energy of the second power supply is efficiently used to reduce the voltage of the second power supply. Therefore, a compact and inexpensive apparatus can be obtained, the backup data can be guaranteed for a longer time for the power supply having the same capacity, and the load voltage can be stably applied.

What is claimed is:

1. A backup apparatus comprising:
   a first backup power supply for applying a power supply voltage to a load when a voltage provided by a main power supply falls below a first threshold voltage, said first backup power supply generating a first threshold voltage;
   threshold voltage generating means for generating a second threshold voltage using a second backup power supply;
   first comparing means for comparing the first threshold voltage generated by said first backup power supply with the voltage of the main power supply;
   second comparing means for comparing the second threshold voltage generated by said threshold voltage generating means with the voltage of said first backup power supply;
   switching means for switching the power supply voltage applied to the load from the main power supply to said first backup power supply in response to a comparison result provided by said second comparing means; and
   output means for outputting the status of said first backup power supply in response to a comparison result provided by said first comparing means.

2. An apparatus according to claim 1, wherein said first backup power supply is a charging power supply, and further comprising additional signal generating means for generating a notification that said first backup power supply is being charged while the main power supply is in operation.

3. An apparatus according to claim 1, wherein the load includes a memory.

4. An apparatus according to claim 3, further comprising refresh control means, wherein, when the memory is backed up by said first backup power supply, said refresh control means controls the refreshing of the memory.

5. A backup apparatus for a plurality of loads comprising a first load and a second load supplied with power by a main power supply, said backup apparatus comprising:
   a first backup power supply for supplying power to the first load when a voltage of the main power supply falls below a first predetermined threshold voltage;
   a second backup power supply for supplying power to the second load when the main power supply voltage falls below a second predetermined threshold voltage;
   first switch means for switching the power supply to the first load from the main power supply to said first backup power supply when the main power supply voltage falls below the first predetermined threshold voltage;
   second switch means for switching the power supply to the second load from the main power supply to said second backup power supply when the main power supply voltage falls below the second predetermined threshold voltage; and
   third switch means for switching the power supply to the second load from said first backup power supply to second backup power supply when a voltage of said first backup power supply voltage falls below the first predetermined threshold voltage.

6. An apparatus according to claim 5, further comprising:
   generating means for generating first and second thresholds;
   first comparing means for comparing the first threshold generated by said generating means with the voltage of the main power supply; and
   second comparing means for comparing the second threshold generated by said generating means with the voltage of said first backup power supply,
   wherein said first and second switch means perform respective switching operations in response to a comparison result obtained by said first comparing means and said third switching means performs a switching operation in response to a comparison result obtained by said second comparing means.

7. A method for backing up a main power supply, comprising:
   an applying step, of applying a power supply voltage from a first backup power supply to a load when a voltage of the main power supply falls below a predetermined voltage;
   a first generating step, of generating a first threshold voltage from the first backup power supply;
   a second generating step, of generating a second threshold voltage using a second backup power supply;
   a first comparing step, of comparing the first threshold voltage generated in said first generating step with the voltage of the main power supply;
   a second comparing step, of comparing the second threshold voltage generated in said second generating step with the voltage of the backup power supply;
   a switching step, of switching the power supply voltage applied to the load from the main power supply to the first backup power supply in response to a comparison result obtained in said second comparing step; and
   an outputting step, of outputting the status of the first backup power supply in response to a comparison result obtained in said first comparing step.

8. A method according to claim 7, further comprising the step of applying a power supply voltage from a second backup power supply to the load when a voltage of the first backup power supply in response to a comparison result obtained in said second comparing step.

9. A method according to claim 7, further comprising the step of supplying a notification that the first backup power supply is abnormal in accordance with the comparison result obtained in said second comparing step.

10. A method according to claim 8, further comprising the step of supplying a notification that the first backup power supply is abnormal in accordance with the comparison result obtained in said second comparing step.

11. A method according to claim 7, wherein the first backup power supply is a charging power supply, and further comprising the step of generating a notification that the first backup power supply is being charged while the main power supply is in operation.

12. A method for backing up power supplied from a main power supply to a plurality of loads comprising a first load and a second load, said method comprising the steps of:
   supplying power from a first backup power supply to the first load when a voltage of the main power supply falls below a first threshold voltage;
   supplying power from a second backup power supply to the second load when the main power supply voltage falls below a second threshold voltage;
   switching the power supply to the first load from the main power supply to the first backup power supply when the main power supply voltage falls below the first threshold voltage;
   switching the power supply to the second load from the main power supply to the second backup power supply when the main power supply voltage falls below the second threshold voltage; and switching the power supply to the first load from the first backup power supply to the second backup power supply when the voltage of the first backup power supply falls below the second threshold voltage.

13. A method according to claim 12, further comprising:

a generating step, of generating first and second thresholds;

a first comparing step, of comparing the first threshold generated in said generating step with the voltage of the main power supply; and a second comparing step, of comparing the second threshold generated in generating step with the voltage of the first backup power supply, wherein said first and second switching steps are performed to perform respective switching operations in response to a comparison result obtained in said first comparing step and said third switching step is performed to perform a switching operation in response to a comparison result obtained in said second comparing step.

* * * * *

UNITED STATES PATENT AND TRADEMARK OFFICE
CERTIFICATE OF CORRECTION

PATENT NO. : 5,734,204

DATED : March 31, 1998

INVENTOR(S) : IKUO SOBUE

It is certified that error appears in the above-identified patent and that said Letters Patent is hereby corrected as shown below:

COLUMN 1

Line 53, "the" should read --and uses the--;
Line 61, "back" should read --backup--; and
Line 62, "up" should be deleted.

COLUMN 3

Line 4, "old;" should read --old--.

COLUMN 4

Line 33, "a" should be deleted.

COLUMN 11

Line 59, "voltage" should be deleted.

COLUMN 12

Line 36, "when a voltage of the first" should be deleted; and
Line 37, "backup power supply" should be deleted.

UNITED STATES PATENT AND TRADEMARK OFFICE
CERTIFICATE OF CORRECTION

PATENT NO. : 5,734,204

DATED : March 31, 1998

INVENTOR(S) : IKUO SOBUE

It is certified that error appears in the above-identified patent and that said Letters Patent is hereby corrected as shown below:

<u>COLUMN 14</u>

Line 2, "generating" should read --said generating--.

Signed and Sealed this

First Day of December, 1998

*Attest:*

BRUCE LEHMAN

*Attesting Officer*        *Commissioner of Patents and Trademarks*